(12) United States Patent
Dey et al.

(10) Patent No.: US 6,858,145 B2
(45) Date of Patent: Feb. 22, 2005

(54) METHOD OF REMOVING ORGANIC IMPURITIES FROM WATER

(75) Inventors: Avijit Dey, Parc Vista (SG); Gareth Hugh Thomas, Honolulu Towers (SG)

(73) Assignee: Chemitreat PTE LTD, Singapore (SG)

( * ) Notice: Subject to any disclaimer, the term of this patent is extended or adjusted under 35 U.S.C. 154(b) by 25 days.

(21) Appl. No.: 10/242,479

(22) Filed: Sep. 12, 2002

(65) Prior Publication Data
US 2004/0050786 A1 Mar. 18, 2004

(51) Int. Cl.$^7$ .......................... B01D 61/36; B01D 65/02
(52) U.S. Cl. ................. 210/640; 210/663; 210/702; 210/764; 210/774; 210/806
(58) Field of Search ................. 210/637, 640, 210/641, 642, 649, 651, 652, 653, 663, 669, 702, 774, 764, 806, 900, 908; 95/45; 96/6

(56) References Cited

U.S. PATENT DOCUMENTS

| | | | | |
|---|---|---|---|---|
| 4,875,980 A | * | 10/1989 | Arita et al. | 203/14 |
| 5,266,206 A | * | 11/1993 | Baker et al. | 210/640 |
| 5,387,378 A | * | 2/1995 | Pintauro et al. | 264/48 |
| 5,512,178 A | * | 4/1996 | Dempo | 210/638 |
| 6,039,878 A | * | 3/2000 | Sikdar et al. | 210/640 |
| 6,440,309 B1 | * | 8/2002 | Cohen | 210/640 |
| 6,623,637 B1 | * | 9/2003 | Monzen et al. | 210/321.74 |

* cited by examiner

*Primary Examiner*—Joseph W. Drodge
(74) *Attorney, Agent, or Firm*—Timothy J. Keefer; Seyfarth Shaw LLP

(57) ABSTRACT

In addition to health implications, trihalomethanes (THMs) poses a challenge to the electronic industry where such impurities cannot be tolerated. A process is provided for removing THMs from high-purity water used in the electronic industry. The method of the invention comprises contacting the high-purity water with a membrane degassifier, preferably operating at a temperature exceeding 45° C.

45 Claims, 8 Drawing Sheets

High-purity water system

*FIGURE 1*: High-purity water system

FIGURE 8: Conventional High-purity water make-up system

PRIOR ART

METHOD OF REMOVING ORGANIC IMPURITIES FROM WATER

FIELD OF THE INVENTION

The present invention relates generally to removal of trihalomethanes (THMs) from high-purity water. More particularly but not exclusively the invention relates to the removal of THMs by an enhanced membrane degassifier operation.

BACKGROUND OF THE INVENTION

Chlorine is commonly used in water treatment processes for a number of reasons. It acts as a disinfectant, can remove ammonia and other nitrogenous organic compounds, it can also control the taste, smell and colour of the water as well as removing slime or algae. However trihalomethanes (THMs) are produced when chlorine reacts with humic acids, fulvic acids, and other Natural Organic Material (NOM) present in the water.
Trihalomethanes THMs are the largest class of Disinfection by-products (DBP) present in the most municipal waters. The four common THMs are Chloroform ($CHCl_3$), dibromochloromethane ($CHBr_2Cl$), dichlorobromomethane ($CHCl_2Br$), and bromoform ($CHBr_3$). Total Trihalomethanes (TTHM) is measured as the sum concentration of these four components. They are Cancer Group B Carcinogens (shown to cause cancer in laboratory animals). Chloroform is by far the most common in most water systems. Dibromochloromethane is the most serious cancer risk, followed in order by bromoform, chloroform and dichlorobromomethane. There have been studies that suggest a connection between TTHM and particularly bladder and possibly colon and rectal cancer. Table 1 indicates the Physical properties of THM Compounds.

TABLE 1

PHYSICAL PROPERTIES OF THM COMPOUNDS

| Component | Formula | Molecular weight | Boiling point, ° C. |
|---|---|---|---|
| Chloroform | $CHCl_3$ | 119.38 | 61.0 |
| Dibromochloromethane | $CHBr_2Cl$ | 208.29 | 119.5 |
| Dichlorobromomethane | $CHCl_2Br$ | 163.83 | 87.0 |
| Bromoform | $CHBr_3$ | 252.75 | 150.5 |

The requirement for high-purity water with particular properties has evolved in several industries. The water purity requirements of the semiconductor industry are among the most stringent of any industry. High-purity water processing procedures and the hardware required for carrying them out are complex and expensive. One such method is shown in U.S. Pat. No. 5,024,766, issued June 1991 to Mahmud, for point of use deionised water purification unit. The emphasis of this patent is on the reduction of organic contaminants. High-purity water treatment facilities adopt various techniques to achieve sub-ppb level of Total Organic Carbon (TOC) concentration. In the electronic Industry, organic compounds present in the rinse water can affect device yields and electrical characteristics. Organics have been implicated as causing "haze". Irregular gate oxide densities were attributed to organic impurities in rinse waters. Current Ultra Pure Water standards for Electronics and Semiconductor Industry specify a TOC content of less than 1 ppb for deionised water that contacts the wafer surface during processing. It is important to note that the THMs are among the most difficult volatile organic component in TOC to treat.

Trihalomethanes are classified under Volatile Organic Compounds (VOC). VOC separation, especially removal at trace level, poses a challenge to the electronic industry where such impurities cannot be tolerated. Apparatus for the continuous removal of volatile organic halogenated compounds are known, for example, from U.S. Pat. Nos. 4,892,664; 5,004,484; 5,470,478; and 5,490,941.

The concentration of THMs and other halogenated organics in water can be reduced by adsorption with high iodine value GAC Filters to a limited extent. Their low molecular weight allows free passage through Reverse Osmosis (RO) membranes. UV 185 nm technology, commonly used for the reduction of TOC in high-purity water systems, also cannot modify chloroform to yield an ionic entity capable of ion-exchange removal. The THMs containing bromine are decomposed by the action of UV Radiation. Their boiling points are close enough to that of water to render them difficult to separate from water by distillation, particularly at trace levels. Vacuum degassification is promising for the lighter THMs, those with fewer bromine atoms, but less encouraging for their heavier analogues.

In PCT/US00/21422/(WO 01/12559) (The Coca-Cola Company) discloses a consolidated approach to water treatment (ie for removing microbiological contamination, bicarbonate hardness, VOCs/THMs, chlorine, turbidity and heavy metals) reliant on heating to breakdown bicarbonate hardness in the water to filterable precipitates and to issue gases from the water for collection in a headspace beyond a water contacting hermetic barrier. In this instance the water can pass through the membrane so gases are not selectively removed by the membrane (no membrane separation of any gas is involved).
Vacuum Degassification A method for removing THMs and dissolved oxygen by vacuum degassing is shown in U.S. Pat. No. 6,277,175, issued August 2001 to Halder et al. The use of membrane contactors for degassing of high-purity water is known as disclosed in, for example, U.S. Pat. Nos. 5,264,171; 5,352,361; 5,938,922; and 6,402,818; Japanese Patent Nos. 2,725,311; 2,743,419; and 2,949,732; and commercially available products traded under the name of Separel. RTM hollow fibre membrane degassing modules from Dainippon Ink and Chemicals, Inc. of Tokyo, Japan, and Liqui-Cel. RTM membrane contactors from Celgard Inc. of Charlotte, N.C. However, a membrane contactor provides very little removal of THMs under conventional operating conditions.

OBJECT OF THE INVENTION

It is an object of the invention to provide an improved method of removing trihalomethanes from water, additionally or alternatively to overcome some of the abovementioned disadvantages, and additionally or alternatively to at least provide the public with a useful alternative.

SUMMARY OF THE INVENTION

According to a first aspect of the invention there is provided a method of removing THMs from an aqueous system which comprises or includes the steps of:
  contacting the aqueous system with a gas transfer contactor membrane whilst
  applying a pressure differential across the membrane to draw the THMs from the water of the aqueous system through the membrane, recovering the purified water,
wherein the water prior to contact with the membrane has been deionised, and wherein the water prior to contact with the membrane, and after deionisation has been heated to above ambient temperature, and below that at which the membrane decomposes.

Preferably the water has been heated into the range between 30° C. and 50° C.; more preferably to substantially 45° C.

Preferably the pressure differential is applied across the membrane by use of a vacuum and/or positive pressure of an inert or unreactive gas either separately or in combination.

Preferably the membrane pore size is such as to allow dissolved gases to pass through but prevent water from passing through. Preferably the membrane is a hydrophobic polypropylene membrane.

Preferably the membrane includes or comprises a plurality of hollow fibres, substantially each fibre having a lumen wherein substantially each lumen is able to communicate with the vacuum and/or inert gas source, and wherein the pressure differential is applied via application of the vacuum and/or positive pressure of the inert or unreactive gas either separately Or in combination within the lumen of the hollow fibres.

Preferably the gas is nitrogen, more preferably nitrogen of purity great than 99.995%.

Preferably the vacuum is between 100 mm Hg and 50 mm Hg absolute.

Preferably the fibres are arranged as a contactor membrane unit into an array wound around a distribution tube with a central baffle.

Preferably there may be one contactor membrane unit. Alternatively there may be more than one contactor membrane unit, which may be arranged in series or in parallel.

Preferably the flow rate of the aqueous system through the contactor membrane unit may be controlled between 5–30 gpm; more preferably the flow rate is substantially 7 gpm.

Preferably one of the THMs removed by contact with the membrane is chloroform and the chloroform content of the water of the aqueous system exiting the membrane unit is substantially less than or equal to 18% of that entering the membrane unit.

Preferably the total organic content of the water of the aqueous system exiting the membrane unit is substantially less than or equal to 21% of that entering the membrane unit.

Preferably the dissolved oxygen content of the water of the aqueous system exiting the membrane unit is substantially less than or equal to 0.01% of that entering the membrane unit.

Preferably prior to deionisation, the water of the aqueous system has had the level of organics and/or chlorine and/or other impurities reduced.

Preferably the level or organics and/or chlorine and/or other impurities have been reduced by passage through one or more activated carbon filters.

Preferably prior to ion exchange deionisation, the water of the aqueous system has had the level of organics and/or ionic impurities (including any of alkali or alkaline earth ions, bicarbonates, carbonates, sulphates, chlorides, nitrates, fluorides or silica) and/or heavy metals and/or microbiological contaminants and/or other impurities reduced.

Preferably the level of ionic impurities and/or heavy metals and/or microbiological contaminants and/or organics and/or other impurities has been reduced by passage through a reverse osmosis system.

Preferably the reverse osmosis system is a two-pass reverse osmosis system.

Preferably the level of organic contaminants in the water of the aqueous system has been further reduced prior to ion exchange deionisation.

Preferably the level of organic contaminants has been further reduced by passage through a UV total organic content reducer.

Preferably the water of the aqueous system has been deionised prior to contact with the membrane by use of one or both of a continuous electrodeioniser and/or a mixed bed deioniser.

Preferably the water of the aqueous system has been heated after deionisation and prior to contact with the membrane by passage through an immersion heater.

According to a second aspect of the invention there is provided a water purification process comprising or including the operations of:

deionisation of the water,
heating of the water,
reduction of the level of THMs in the water
wherein the operation of reduction of the level of THMs in the water is achieved by contacting the heated, deionised water with a gas transfer contactor membrane whilst applying a pressure differential across the membrane to draw the THMs from the water of the aqueous system through the membrane,
and wherein the heating of the water is to a temperature between ambient and the temperature at which the membrane decomposes.

Preferably the water has been heated into the range between 30° C. and 50° C.; more preferably to substantially 45° C.

Preferably the pressure differential is applied across the membrane by use of a vacuum and/or positive pressure of an inert or unreactive gas either separately or in combination.

Preferably the membrane includes or comprises a plurality of hollow fibres, substantially each fibre having a lumen wherein substantially each lumen is able to communicate with the vacuum and/or inert gas source, and wherein the pressure differential is applied via application of the vacuum and/or positive pressure of the inert or unreactive gas either separately or in combination within the lumen of the hollow fibres.

Preferably the gas is nitrogen, more preferably nitrogen of purity great than 99.995%.

Preferably the vacuum is between 100 mm Hg and 50 mm Hg absolute.

Preferably the fibres are hollow polypropylene fibres, more preferably arranged as a contactor membrane unit into an array wound around a distribution tube with a central baffle.

Preferably there may be one contactor membrane unit. Alternatively there may be more than one contactor membrane unit, which may be arranged in series or in parallel.

Preferably the flow rate of the aqueous system through the contactor membrane unit may be controlled between 5–30 gpm; more preferably the flow rate is substantially 7 gpm.

Preferably one of the THMs removed by contact with the membrane is chloroform and the chloroform content of the water of the aqueous system exiting the membrane-unit is substantially less than or equal to 18% of that entering the membrane unit.

Preferably the total organic content of the water of the aqueous system exiting the membrane unit is substantially less than or equal to 21% of that entering the membrane unit.

Preferably the dissolved oxygen content of the water of the aqueous system exiting the membrane unit is substantially less than or equal to 0.01% of that entering the membrane unit.

Preferably the operation of heating is via passage of the water of the aqueous system through an immersion heater.

Preferably the operation of deionisation is by use of one or both of a continuous electrodeioniser and/or a mixed bed deioniser.

Preferably the water purification process may include one of more of the following operations prior to deionisation of the water:

passage through an activated carbon filter, passage through a reverse osmosis system, passage through a UV total organic content remover.

Preferably the water purification process may include one or more of the following operations after contact with the membrane:

passage through a UV total organic content remover passage through a polishing loop.

Figure 1:
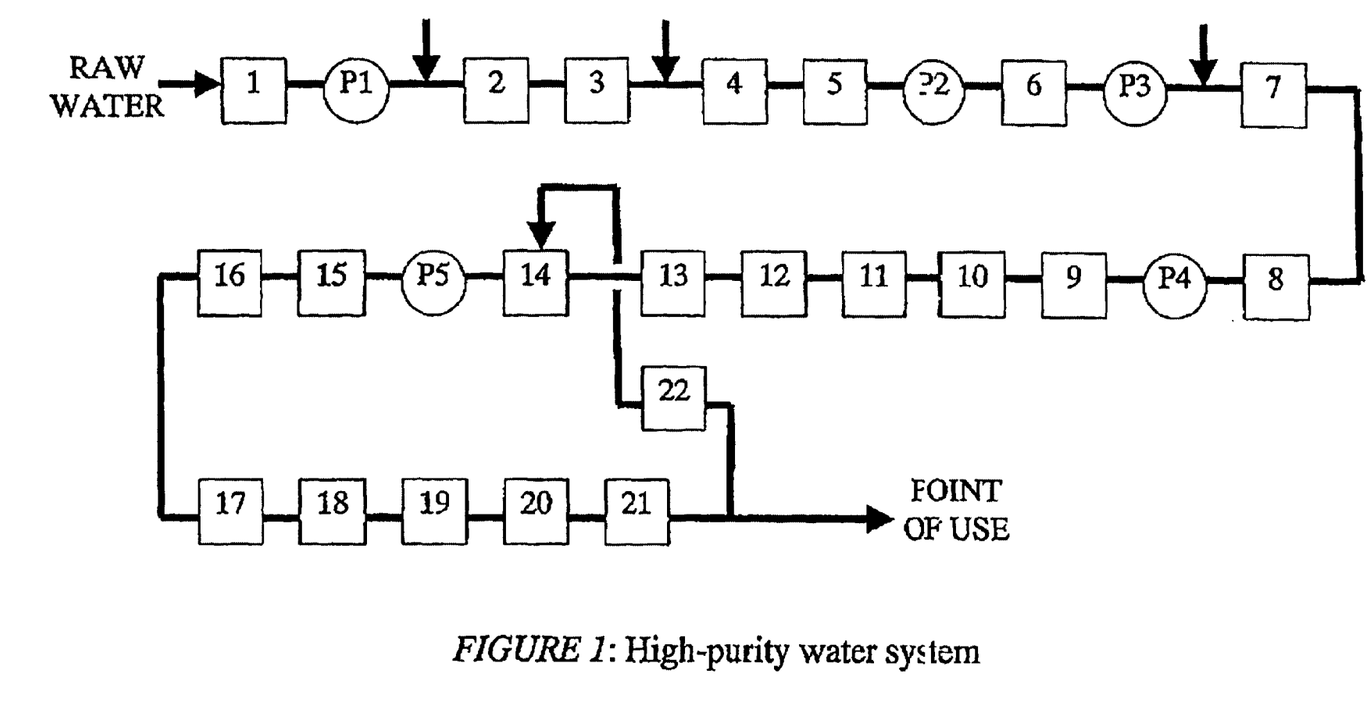
FIG. 1 illustrates the preferred overall system of water purification of the invention.

Preferably the water purification process is as illustrated in FIG. 1.

According to a third aspect of the invention there is provided purified water prepared substantially according to the abovementioned process.

BRIEF DESCRIPTION OF THE FIGURES

The invention will now be described with reference to the Figures in which.

DETAILED DESCRIPTION OF THE INVENTION

The invention is designed to remove THMs using a hot membrane contactor operating at temperatures above ambient, preferably at a temperature around 45° C. We have found an increase in THM removal efficiency as well as higher dissolved oxygen (DO) and total organic carbon removal than has heretofore been feasible with membrane contactors under conventional operating conditions.

Figure 8:
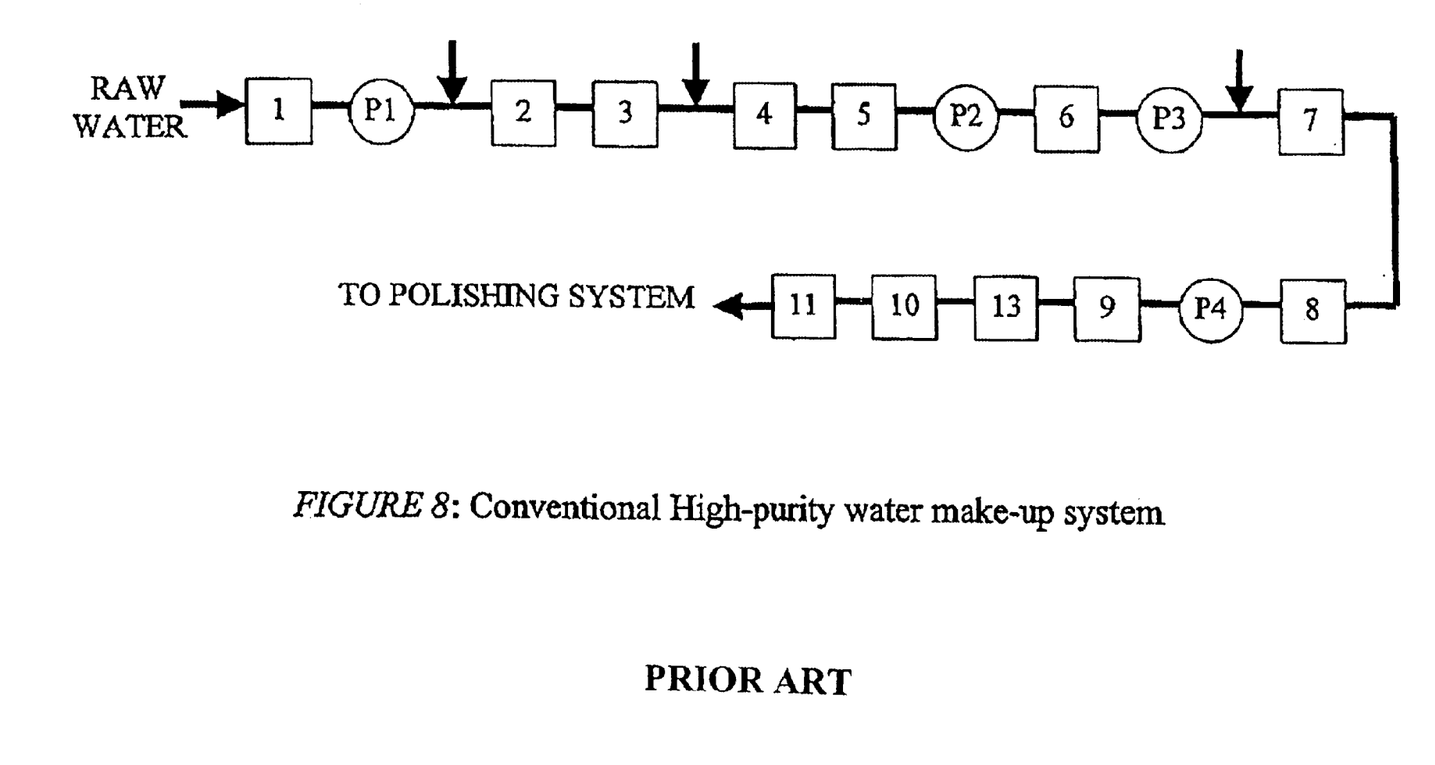
FIG. 8 illustrates a typical prior art system of water purification.

FIG. 1 illustrates the one embodiment of overall high-purity water system which incorporates the process of the invention. FIG. 8 illustrates a conventional prior art high purity water system in which, importantly the water to be purified of THMs is not heated to a temperature above ambient. In FIG. 8 water passes through a two pass reverse osmosis system 6, 7 to a permeate storage tank 8 through the primary UV TOC reducers 9 for the reduction of organic content in the water and then to the primary membrane degassifier 13 to remove dissolved oxygen and THMs. Subsequently, water passes through a continuous electro-dioniser (CEDI) unit 10 followed by the primary mixed bed deioniser 11 for the reduction of ionic impurities in the water. The CEDI unit 10 and the primary mixed bed deioniser 11 can not operate at elevated temperatures.

The preferred embodiment is now described with reference to FIG. 1. FIG. 1 shows a raw water storage tank 1, an in-line static mixer 2, a multimedia filter 3, an activated carbon filter 4, a 1 micron nominal cartridge filter 5, first-pass reverse osmosis membrane filter 6, second-pass reverse osmosis membrane filter 7, a permeate storage tank 8, a primary UV TOC reducer 9, a continuous electro-deioniser (CEDI) 10, a primary mixed bed deioniser 11, a deionised water heater 12, a primary membrane degassifier 13, a deionised water storage tank 14, a plate type heat exchanger 15, a secondary UV TOC reducer 16, a sacrificial polishing mixed bed deioniser 17, a secondary membrane degassifier 18, an UV disinfection unit 19, a 0.1 micron absolute cartridge filter 20, an ultrafiltration membrane 21, an UV disinfection unit 22 in the return line, and pumps P1–P5.

Figure 2:
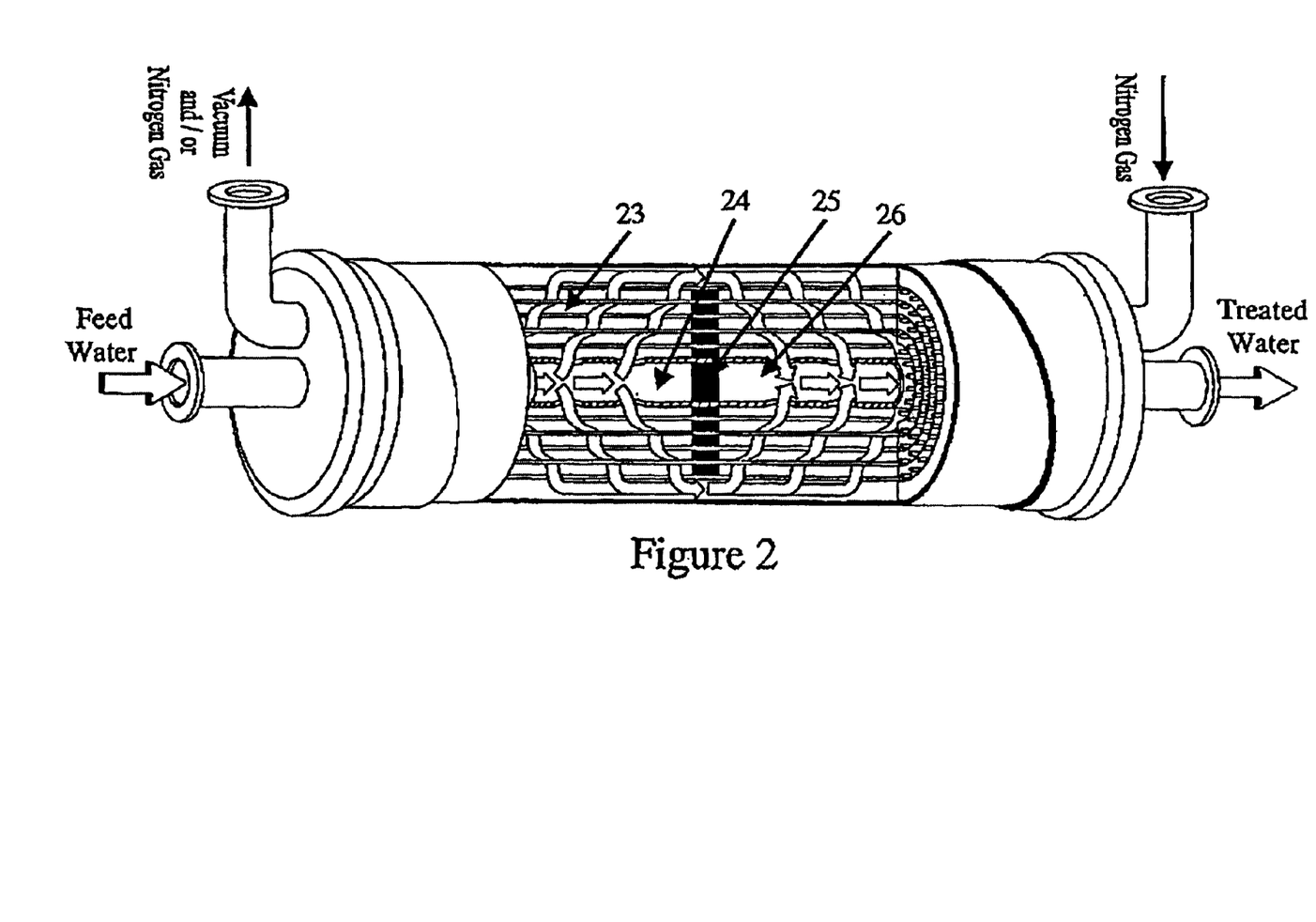
FIG. 2 illustrates the preferred membrane degasser used in the method of the invention.

Essential components of this embodiment are the existence and positioning of the continuous electro-deioniser (CEDI) 10, a primary mixed bed deioniser 11, a deionised water heater 12, and a primary membrane degassifier 13. The preferred form of the primary membrane degassifier 19 is as illustrated in FIG. 2. It will be appreciated that many different embodiments of a purification system other than that of FIG. 1, could be envisaged by those skilled in the art, but which fall within the scope of the invention.

The operation of the embodiment of FIG. 1 is illustrated by the following experimental description:

Experimental Set Up

City water was received in the raw water storage tank 1 and is pumped by a multi-stage vertical centrifugal pump P1 through the multimedia filter 3 for the reduction of suspended solids. Coagulant (PAC) is added before the multimedia filter 3 for coagulation of suspended solids and an in-line static-mixer 2 is provided to ensure the proper mixing of the coagulant with water. The filtered water from multimedia filter 3 passed through the activated carbon filter 4 for the removal of organics and residual chlorine. Sodium bisulphite dosing was provided prior to the activated carbon filter 4 for the removal of free chlorine and dissolved oxygen. The treated water from the activated carbon filter 4 was then taken to a 1-micron cartridge filter 5 for the removal of fine solids.

The two pass RO system consist of high-pressure flooded suction multi-stage vertical centrifugal pumps P2 and P3, first-pass reverse osmosis membrane filters 6 and second-pass reverse osmosis membrane filters 7. Caustic soda is added between the two passes to improve the performance of the membrane filters with respect to the rejection of weakly ionised silica, boron, and organics in the second-pass reverse osmosis membrane filter 7. The Pittner U.S. Pat. No. 4,574,049, issued Mar. 4, 1986 for a Reverse Osmosis System, discloses the use of a chemical treatment agent such as sodium hydroxide between the two reverse osmosis units operating in series. The Debasish Mukhopadhyay U.S. Pat. No. 5,925,255, issued Jul. 20, 1999 for high efficiency reverse osmosis (HERO) operation, accomplishes high rejection of weakly ionised species such as boron, silica, and TOC by increasing the pH of the feed water to about 10.5. This patent discloses a unique pre-treatment method using weak acid cation exchanger for the removal of hardness and non-hydroxide alkalinity. Spiral-wounded polyamide composite reverse osmosis membranes were used in 6 and 7. The reject stream from the second-pass reverse osmosis membrane filters 7 is recycled back to the first-pass feed stream. Permeate from the two-pass reverse osmosis system was taken to permeate storage tank 8. From the permeate storage tank 8, water is pumped by a multi-stage vertical centrifugal pump P4 through the primary UV TOC reducer 9 for the reduction of organic content in the water. Water from the primary UV TOC reducer 9 passes through the CEDI unit 10 followed by the primary mixed bed deioniser 11 for the reduction of ionic impurities in the water. Finally it passed through the primary membrane degassifier 13 to remove dissolved oxygen and THMs.

From the make-up treatment loop, water was taken to the deionised water storage tank 14. This tank 14 was nitrogen blanketed to ensure that the water inside the tank is not contaminated from the outside air. Water was pumped by high-pressure flooded suction multi-stage vertical centrifugal pump P5 through the Heat Exchanger 15 to reduce the temperature and then was passed through the secondary UV TOC Reducer 16 for the removal of organics. The water from the outlet of this secondary UV TOC Unit 16 passed through a sacrificial polishing mixed bed deioniser 17 followed by a secondary membrane degassifier 18. The resin in the sacrificial polishing mixed bed deioniser 17 was a sacrificial type. Water from the secondary membrane degassifier 18 passed through a UV disinfection unit 19 followed by a 0.1 μm absolute cartridge Filter 20. The Ultrafiltration (UF) Unit 21 is the final equipment in the Polishing loop and the product water from this UF unit 21 is monitored continuously for Flow, Pressure, Temperature, Resistivity, Particle Count, TOC, and Dissolved Oxygen. Return water from Point-of-use (POU) is taken back to the deionised water storage tank 14 through a Return UV disinfection unit 22.

The deionised water immersion electric heater 12 is typically of electro-polished stainless steel 316 L construction to resist corrosion. The THM-bearing deionised water enters the heater at about 25° C. and is heated to about 45° C. temperature. The primary membrane degassifier 13 is a baffled device that is shown in U.S. Pat. No. 5,352,361, and as shown in FIG. 2. In this design, the hollow-fibres 23 which is an example of a gas transfer membrane are woven into a fabric array. The fabric is wound around a central distribution tube 24. A baffle 25 is placed at the centre of the bundle. Water enters into the porous central distribution tube 24, is forced radially outwards across the fibres by the battle 25, and is then collected in the collection tube 26. This geometry, involving flow outside of, but perpendicular to, a fibre bundle offers faster mass transfer. During the operation, deionised water flows over the shell-side of the hollow fibres. Pure nitrogen gas or vacuum, either separately or in combination, is applied on the lumen-side of the hollow fibres. Because of its hydrophobic nature, the membrane acts as an inert support to allow intimate contact between gas and liquid phases without dispersion. The interface is immobilised at the pore by applying a higher pressure to the deionised water stream relative to the nitrogen gas stream. As the deionised water flows over the outside of the fibres, nitrogen gas and vacuum flows counter-current inside the hollow fibres. The result is fast diffusive transfer of dissolved gases and volatile organics from or to the liquid phase.

Details of the preferred primary membrane degassifier 13 are given in Table 2:

TABLE 2

MEMBRANE DEGASSIFIER DETAILS

| | |
|---|---|
| Design Flowrate | 11.0 gpm |
| Supplier | Hoechst Celanese Corporation, 13800 South Lakes Drive, Charlotte, North Carolina 28273 |
| Model Number | Liqui-Cel ® 4 × 28 |
| Fibre type | X-40 microporous PP Hollow Fibre |
| Effective membrane surface area | 19.5 m$^2$ |
| Effective area per unit volume | 3600 m$^2$/m$^3$ |
| Effective length of membrane fibres | 62.48 cm |
| Outside diameter of the membrane fibre | 300 μm |
| Wall thickness | 25 μm |
| Distribution/Collection tube diameter | 1 inch |
| Number of Contactors in Series | Two (2) |
| Design Temperature | 25° C. |
| Design Vacuum level | 50.0 mm Hg absolute |
| Nitrogen Sweep rate per contactor | :0.066 scfm @ 60° F., 14.7 psig |
| Maximum allowable feed pressure | 106.27 psig |
| Nitrogen Purity | 99.995% |

Experimental Detail

A typical characteristic of the Singapore City Water used in the present experimental study in terms of organics concentrations, including THMs, is as follows in Table 3:

TABLE 3

WATER CONTENT OF EXPERIMENT

| | |
|---|---|
| Average Total Organic Carbon (TOC) | 3.0 ppm |
| Average Chloroform | 70 ppb |
| Average Dibromochloromethane | 20 ppb |
| Average Dichlorobromomethane | 40 ppb |
| Average Bromoform | <5 ppb |

Actual dissolved oxygen concentrations at the inlet of the primary membrane degassifier 13 are much below its saturation level due to the addition of sodium bisulphite prior to the activated carbon filter 4. Actual TOC and THMs concentrations at the inlet of the primary membrane degassifier 13 are much below the concentration levels found in the city water. The following unit operations in the preferred embodiment are involved in the removal of organics including THMs priors to the primary membrane degassifier 13:

Activated Carbon Filter 4
First-pass reverse osmosis membrane filters 6
Second-pass reverse osmosis membrane filters 7.
Primary UV TOC Reducer 9
Continuous electro-deioniser (CEDI) 10
Primary mixed bed deioniser 11

Using the preferred embodiment described above, a series of experiments were conducted around primary membrane degassifier 13 at various temperatures, applied flux rates and vacuum levels. Nitrogen sweep-rate was-kept constant at 0.066 scfm per contactor.

It was observed that the concentration of dibromochloromethane, dichlorobromomethane, and bromoform at the inlet of the primary membrane degassifier 13 were always below the instrument detection limit of 0.5 ppb. Inlet chloroform concentration to the primary membrane degassifier 13 was between 14.0 and 17.0 ppb.

It was found in our experimental work that the temperature, the applied flux rate and the vacuum level strongly affect the removal of Chloroform by the primary membrane degassifier 13. Operational results of the pilot test unit may be better appreciated by reference to FIGS. 3 to 7.

Figure 3:
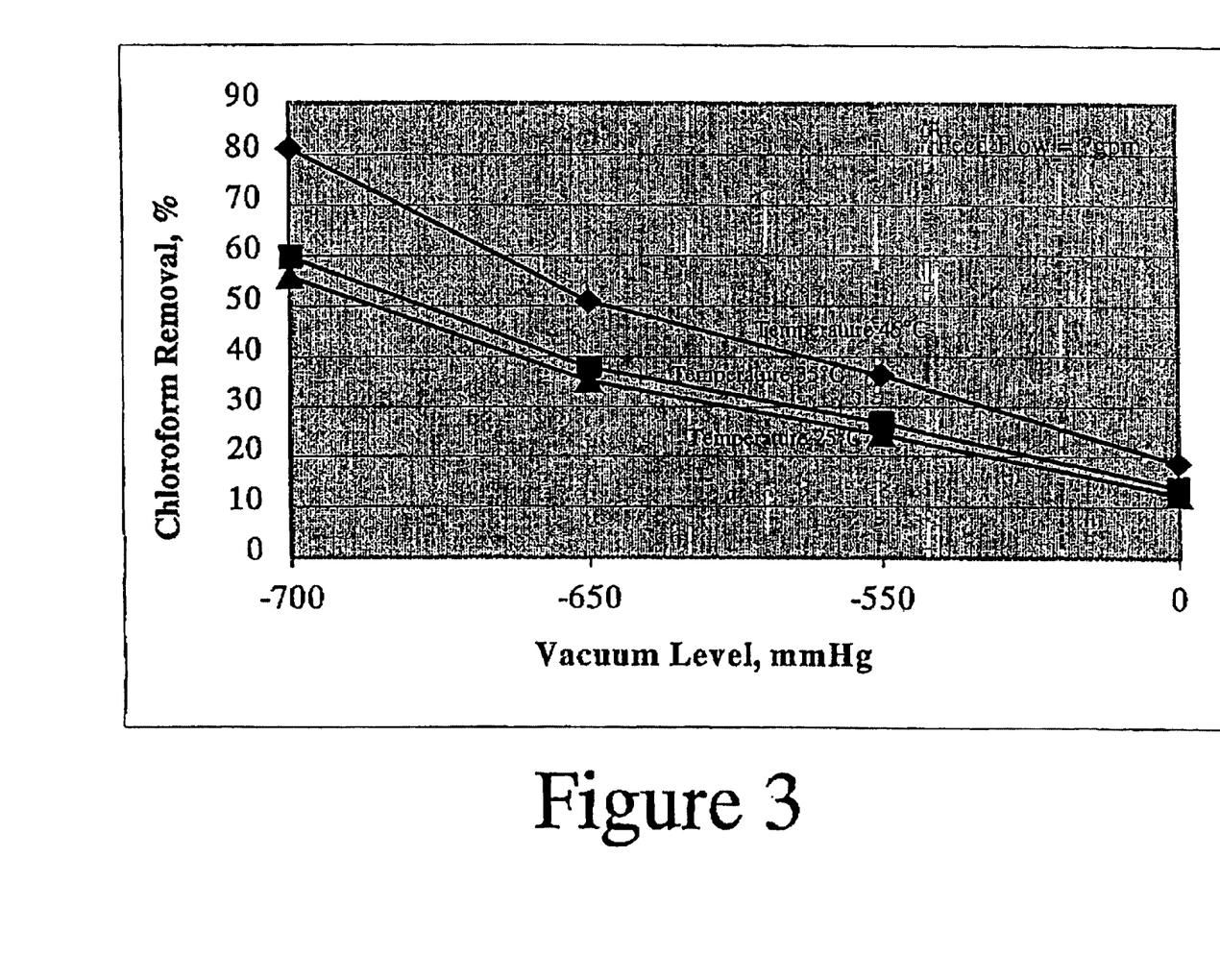
FIG. 3 illustrates chloroform removal against vacuum level at a feed flow of 7 gpm.
Figure 4:
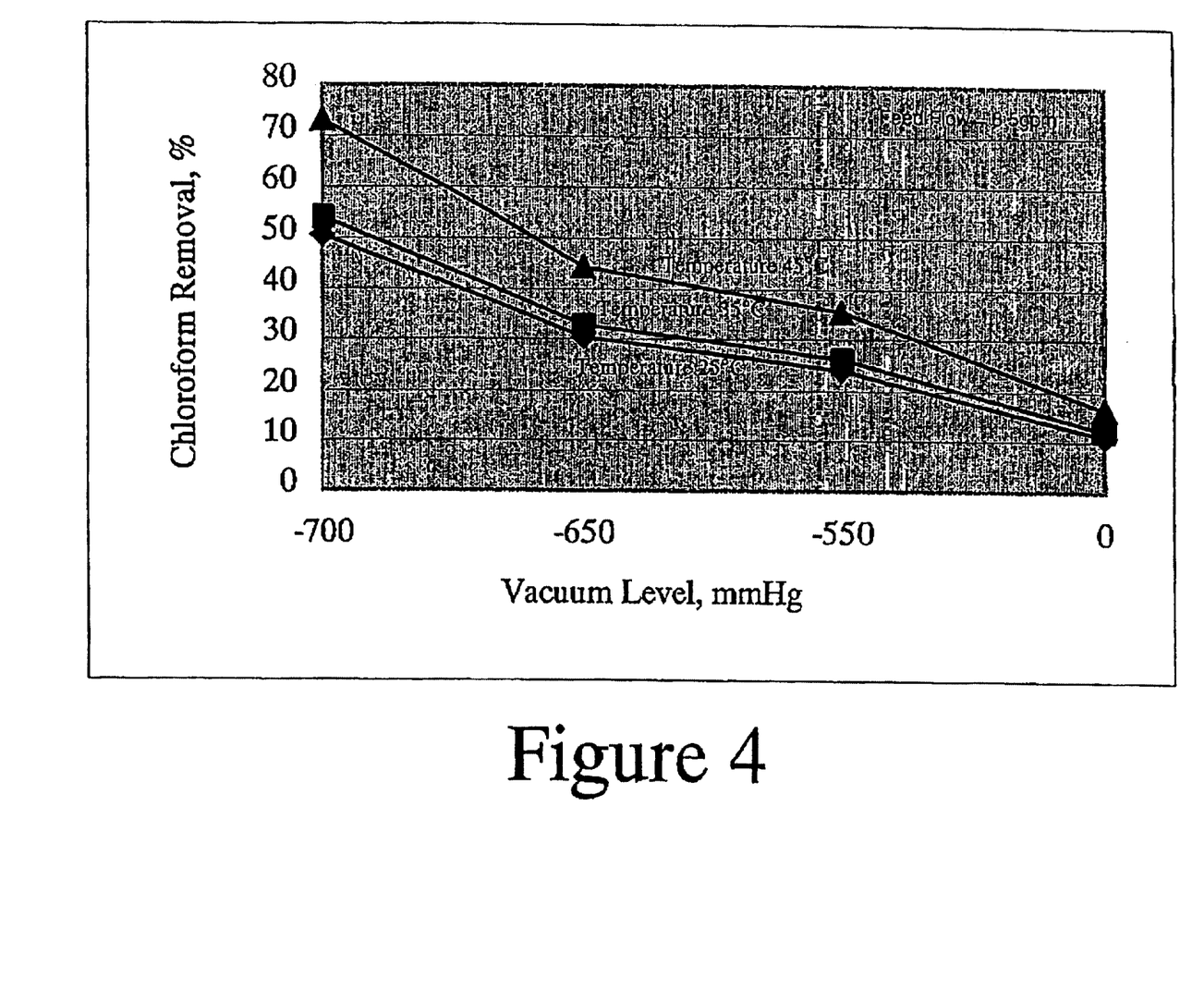
FIG. 4 illustrates chloroform removal against vacuum level at a feed flow of 8.5 gpm.
Figure 5:
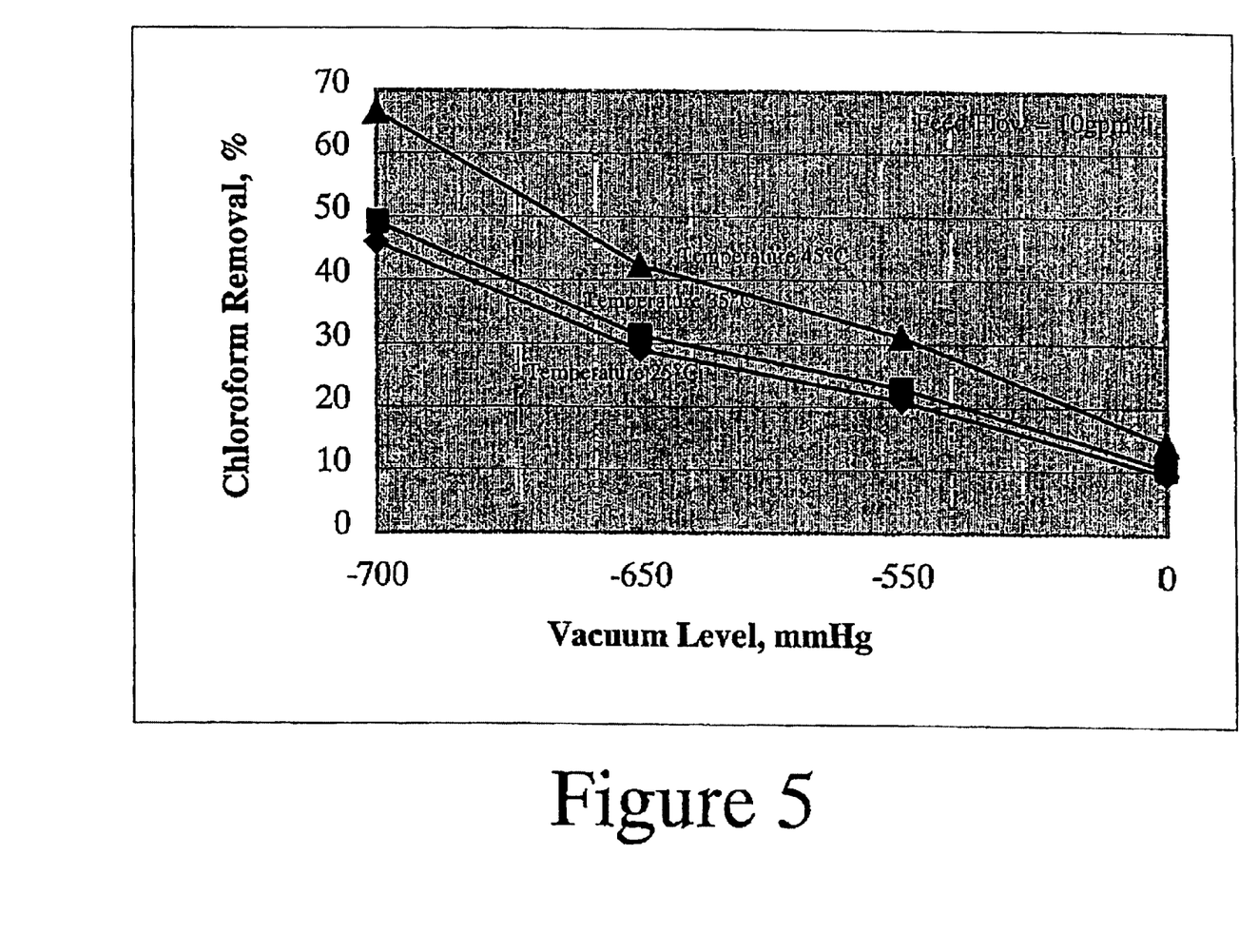
FIG. 5 illustrates chloroform removal against vacuum level at a feed flow of 10 gpm.
Figure 6:
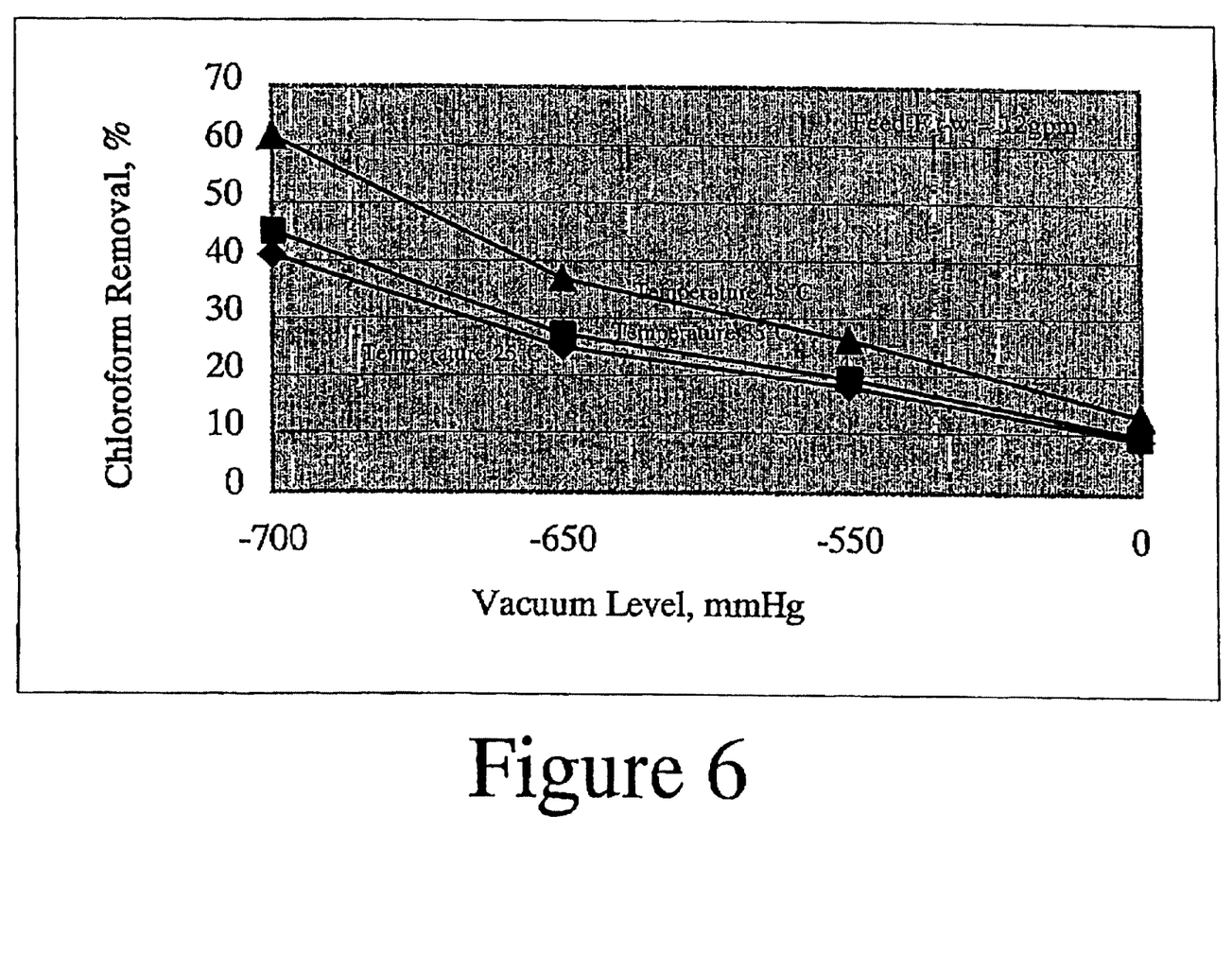
FIG. 6 illustrates chloroform removal against vacuum level at a feed flow of 12 gpm.
Figure 7:
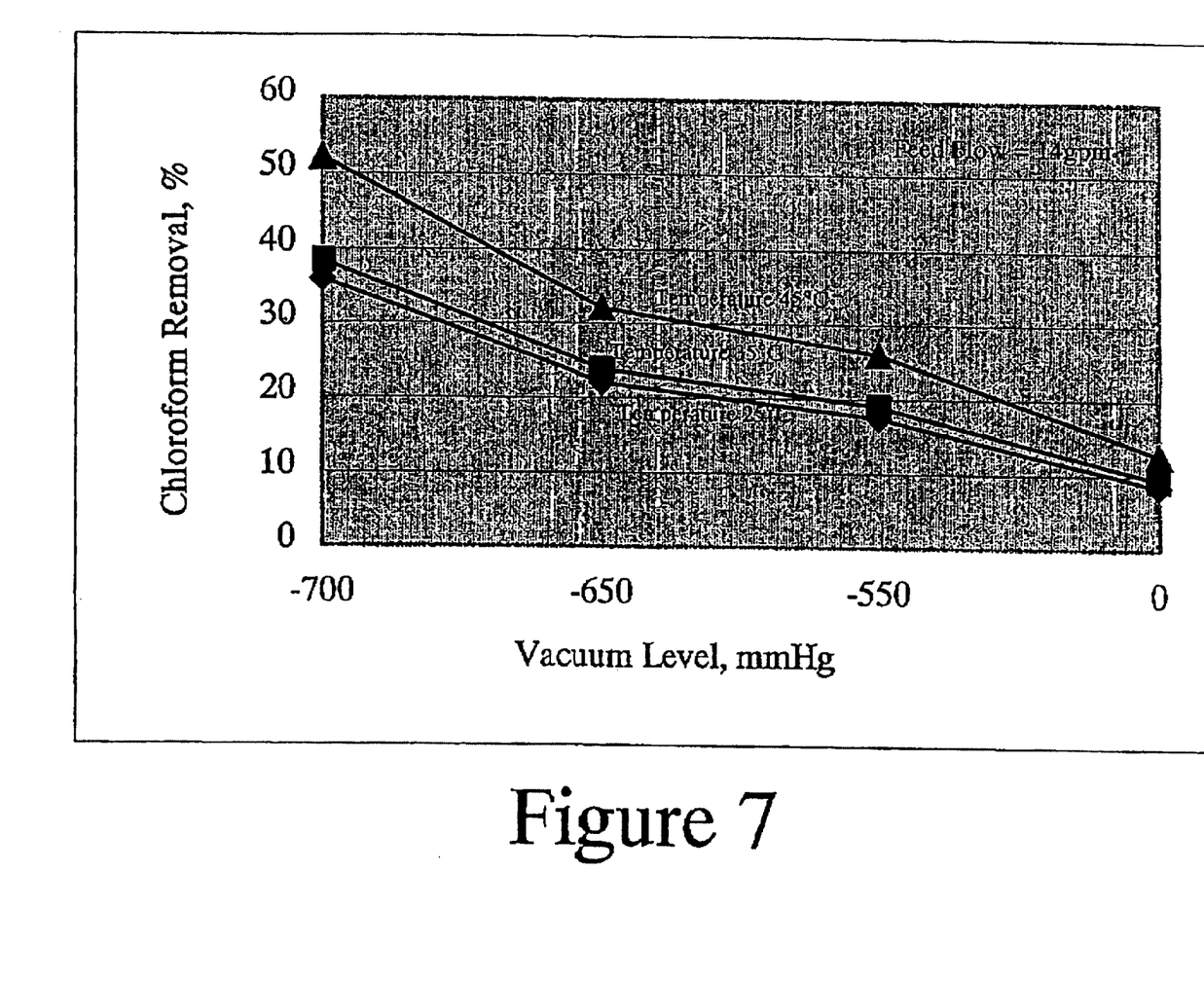
FIG. 7 illustrates chloroform removal against vacuum level at a feed flow of 14 gpm.

FIG. 3 illustrates the chloroform concentration in the membrane contactor product stream at a flow rate of 7 gpm over a month period in pilot test equipment FIGS. 4 through 7 respectively illustrates the chloroform concentration in the membrane contactor product stream at flow rates of 8.5, 10, 12, and 14 gpm over a month period in the pilot test equipment. These concentrations are based on the arithmetical mean chloroform concentration in the pilot unit. The improvement in the removal of chloroform at lower flux rate and higher temperature and vacuum levels can be attributed to the issues related to the efficiency of mass transfer operation in the primary membrane degassifier 13. It was observed in the present experimental study that the effect of the feed water temperatures and the applied vacuum levels influences the chloroform removal efficiency more than the flux rates through the primary membrane degassifier 13. Consequently, it is recommended to apply a high temperature (45° C. or higher) and high vacuum level (−700 mm Hg gauge or higher) to strip the chloroform from the water stream. However, reduction of flux rates through the unit also improves the chloroform removal efficiency of the primary membrane degassifier 13 to considerable extent.

Measurement of THMs were performed off-line by a Purge and Trap GC-MS system for THMs above 5 ppb level and a Purge and Trap GC-ECD system for THMs in the range of 0.5 to 5.0 ppb. The Purge and Trap CC-MS system consists of HP 6890 GC equipped with HP 5973 MSD under the control of HP Chemstation software. This system uses Helium as the carrier and the purging gas. The Purge and Trap GC-ECD system consists of HP 6890 GC equipped with HP-ECD detector under the control of HP Chemstation software. This system also uses Helium as the carrier and the purging gas.

Inlet TOC concentration to the primary membrane degassifier 13 was between 10.0 and 18.0 ppb during the present experimental study. It was found in the present experimental work that the temperature, the applied flux rate and the vacuum level strongly affect the removal of TOC in primary membrane degassifier 13. The improvement in the removal of TOC at lower flux rate and higher temperature and vacuum condition can be attributed to the issues related to the efficiency of mass transfer operation in the primary membrane degassifier 13. It was observed in the present experimental study that the effect of the feed water temperatures and the applied vacuum levels influence the TOC removal efficiency more than the flux rates through the unit. Consequently, it is recommended to apply high temperatures (45° C. or higher) and vacuum levels (−700 mm Hg gauge or higher) to strip the organice from the water stream. However, reduction of flux rates through the unit also improves the organic removal efficiency of the primary membrane degassifier 13 to considerable extent. An Anatel A 1000 XP on-line TOC Analyser performed the measurement of the TOC around the primary membrane degassifier 13.

EXAMPLES

The invention is further described and elucidated in the following examples and teach one how to make use of the invention. These examples are not intended, however, to limit or restrict the scope of the invention in any way and should not be construed as providing conditions, parameters or values which must be utilised exclusively in order to practice the present invention.

Example 1

A test was conducted at the pilot test equipment described above according to the invention at a deionised water feed flow rate of 7 gpm. The applied vacuum level was kept constant at −700 mm Hg. The result of analysis for the deionised water so treated is listed in the following Table 4.

TABLE 4

Performance of two 4-inch contactors in series at 7-gpm flow

| Parameters | Temperature, ° C. | Feed Water | Treated Water | % Removal |
|---|---|---|---|---|
| Chloroform, ppb | 25.0 | 16.9 | 7.5 | 55.6 |
|  | 35.0 | 15.7 | 6.3 | 59.9 |
|  | 45.0 | 14.0 | 2.5 | 82.1 |
| TOC, ppb | 25.0 | 11.3 | 4.9 | 56.6 |
|  | 35.0 | 16.8 | 6.6 | 60.7 |
|  | 45.0 | 13.7 | 2.9 | 78.8 |
| Dissolved oxygen, ppb | 25.0 | 2730 | 2.0 | 99.93 |
|  | 35.0 | 3010 | 0.6 | 99.98 |
|  | 45.0 | 3280 | 0.4 | 99.99 |

Example 2

A test was conducted at the pilot test equipment described above according to the invention at a deionised water feed flow rate of 10 gpm. The applied vacuum level was kept constant at −700 mm Hg. The result of analysis for the deionised water so treated is listed in the following Table 5.

TABLE 5

Performance of two 4-inch contactors in series at 10-gpm flow

| Parameters | Temperature, ° C. | Feed Water | Treated Water | % Removal |
|---|---|---|---|---|
| Chloroform, ppb | 25.0 | 15.2 | 8.2 | 46.0 |
|  | 35.0 | 14.8 | 7.4 | 50.0 |
|  | 45.0 | 16.6 | 5.5 | 66.9 |
| TOC, ppb | 25.0 | 14.3 | 7.9 | 44.8 |
|  | 35.0 | 17.8 | 9.1 | 48.9 |
|  | 45.0 | 11.5 | 3.9 | 66.1 |
| Dissolved oxygen, ppb | 25.0 | 2590 | 6.1 | 99.76 |
|  | 35.0 | 2910 | 2.0 | 99.93 |
|  | 45.0 | 2740 | 0.9 | 99.97 |

Example 3

A test was conducted at the pilot test equipment described above according to the invention at a deionised water feed flow rate of 14 gpm. The applied vacuum level was kept constant at −650 mm Hg. The result of analysis for the deionised water so treated is listed in the following Table 6.

TABLE 6

Performance of two 4-inch contactors in series at 14-gpm flow

| Parameters | Temperature, ° C. | Feed Water | Treated Water | % Removal |
|---|---|---|---|---|
| Chloroform, ppb | 25.0 | 14.1 | 10.9 | 22.7 |
|  | 35.0 | 15.4 | 11.7 | 24.0 |
|  | 45.0 | 14.6 | 9.9 | 32.2 |
| TOC, ppb | 25.0 | 12.4 | 9.7 | 21.8 |
|  | 35.0 | 16.1 | 12.4 | 22.9 |
|  | 45.0 | 10.2 | 7.3 | 28.4 |
| Dissolved oxygen, ppb | 25.0 | 3810 | 36.1 | 99.07 |
|  | 35.0 | 2620 | 8.9 | 99.66 |
|  | 45.0 | 3340 | 6.1 | 99.82 |

What is claimed is:

1. A method of removing THMs from an aqueous system which comprises or includes the steps of:

contacting the aqueous system with a contactor membrane whilst applying a pressure differential across the membrane to draw the THMs from the water of the aqueous system through the membrane, recovering the purified water, wherein the water prior to contact with the membrane has been deionised, and wherein the water prior to contact with the membrane, and after deionisation has been heated to above ambient temperature, and below that at which the membrane decomposes.

2. A method as claimed in claim 1 wherein the water has been heated into the range between 30° C. and 50° C.

3. A method as claimed in claim 2 wherein the water has been heated to approximately 45° C.

4. A method as claimed in claim 3 wherein the pressure differential is applied across the membrane by use of a vacuum and/or positive pressure of an inert or unreactive gas either separately or in combination.

5. A method as claimed in claim 4 the membrane pore size is such as to allow dissolved gases to pass through but prevent water from passing through.

6. A method as claimed in claim 5 wherein the membrane is a hydrophobic polypropylene membrane.

7. A method as claimed in claim 6 wherein the membrane includes or comprises a plurality of hollow fibres, substantially each fibre having a lumen wherein substantially each lumen is able to communicate with the vacuum and/or inert gas source, and wherein the pressure differential is applied via application of the vacuum and/or positive pressure of the inert or unreactive gas either separately or in combination within the lumen of the hollow fibres.

8. A method as claimed in claim 7 wherein the gas is nitrogen.

9. A method as claimed in claim 8 wherein the gas is nitrogen of purity great than 99.995%.

10. A method as claimed in claim 9 wherein the vacuum is between 100 mm Hg and 50 mm Hg absolute.

11. A method as claimed in claim 10 wherein the fibres are arranged as a contactor membrane unit into an array wound around a distribution tube with a central baffle.

12. A method as claimed in claim 11 wherein there is one contactor membrane unit.

13. A method as claimed in claim 12 wherein the flow rate of the aqueous system through the contactor membrane unit is controlled to between 5 to 30 gpm.

14. A method as claimed in claim 13 wherein the flow rate is substantially 7 gpm.

15. A method as claimed in claim 11 wherein there is more than one contactor membrane unit, the units arranged in series or in parallel.

16. A method as claimed in claim 1 wherein one of the THMs removed by contact with the membrane is chloroform and the chloroform content of the water of the aqueous system exiting the membrane unit is substantially less than or equal to 18% of that entering the membrane unit.

17. A method as claimed in claim 16 wherein the total organic content of the water of the aqueous system exiting the membrane unit is substantially less than or equal to 21% of that entering the membrane unit.

18. A method as claimed in claim 17 wherein the dissolved oxygen content of the water of the aqueous system exiting the membrane unit is substantially less than or equal to 0.01% of that entering the membrane unit.

19. A method as claimed in claim 18 wherein prior to deionisation, the water of the aqueous system has had the level of organics and/or chlorine and/or ionic impurities and/or heavy metals and/or microbiological contaminants and/or other impurities reduced.

20. A method as claimed in claim 19 wherein the level of organics and/or chlorine and/or other impurities have been reduced by passage through one or more activated carbon filters.

21. A method as claimed in claim 20 wherein the level of ionic impurities and/or heavy metals and/or microbiological contaminants and/or organics and/or other impurities has been reduced by passage through a reverse osmosis system.

22. A method as claimed in claim 21 wherein the reverse osmosis system is a two-pass reverse osmosis system.

23. A method as claimed in claim 22 wherein the level of organic contaminants has been further reduced by passage through a UV total organic content reducer.

24. A method as claimed in claim 23 wherein the water of the aqueous system has been deionised prior to contact with the membrane by use of one or both of a continuous electrodeioniser and/or a mixed bed deioniser.

25. A method as claimed in claim 24 wherein the water of the aqueous system has been heated after deionisation and prior to contact with the membrane by passage through an immersion heater.

26. A method of removing THMs from an aqueous system, comprising performing coagulant dependent purification process on water from the aqueous system, heating the water to above ambient temperature and below a temperature at which the membrane decomposes, contacting the water with a contactor membrane while applying a pressure differential across the membrane to draw the THMs from the water through the membrane, and recovering purified water, wherein the precipitation dependent process are not part of the contacting step.

27. A water purification process comprising or including the operations of:

deionisation of the water, heating of the water, reduction of the level of THMs in the water, wherein the operation of reduction of the level of THMs in the water is achieved by contacting the heated, deionised water with a gas transfer contactor membrane whilst applying a pressure differential across the membrane to draw the THMs from the water of the aqueous system through the membrane, and wherein the heating of the water is to a temperature between ambient and the temperature at which the membrane decomposes.

28. A method as claimed in claim 27 wherein the water has been heated into the range between 30° C. and 50° C.

29. A method as claimed in claim 28 wherein the water has been heated to approximately 45° C.

30. A method as claimed in claim 29 wherein the pressure differential is applied across the membrane by use of a vacuum and/or positive pressure of an inert or unreactive gas either separately or in combination.

31. A method as claimed in claim 30 wherein the membrane includes or comprises a plurality of hollow fibres, substantially each fibre having a lumen wherein substantially each lumen is able to communicate with the vacuum and/or inert gas source, and wherein the pressure differential is applied via application of the vacuum and/or positive pressure of the inert or unreactive gas either separately or in combination within the lumen of the hollow fibres.

32. A method as claimed in claim 31 wherein the gas is substantially pure nitrogen.

33. A method as claimed in claim 32 wherein the vacuum is between 100 mm Hg and 50 mm Hg absolute.

34. A method as claimed in claim 33 wherein the fibres are hollow polypropylene fibres, more preferably arranged as a contactor membrane unit into an array wound around a distribution tube with a central baffle.

35. A method as claimed in claim 34 wherein there is one contactor membrane unit.

36. A method as claimed in claim 35 wherein there is more than one contactor membrane unit, the units arranged in series or in parallel.

37. A method as claimed in claim 35 wherein the flow rate of the aqueous system through the contactor membrane unit is controlled to between 5–3 gpm.

38. A method as claimed in claim 37 wherein the flow rate of the aqueous system through the contactor membrane unit is controlled to substantially 7 gpm.

39. A method as claimed in claim 38 wherein one of the THMs removed by contact with the membrane is chloroform and the chloroform content of the water of the aqueous system exiting the membrane unit is substantially less than or equal to 18% of that entering the membrane unit.

40. A method as claimed in claim 39 wherein the total organize content of the water of the aqueous system exiting the membrane unit is substantially less than or equal to 21% of that entering the membrane unit.

41. A method as claimed in claim 40 wherein the dissolved oxygen content of the water of the aqueous system exiting the membrane unit is substantially less than or equal to 0.01% of that entering the membrane unit.

42. A method as claimed in claim 41 wherein the operation of heating is via passage of the water of the aqueous system through an immersion heater.

43. A method as claimed in claim 42 wherein the operation of deionisation is by use of one or both of a continuous electrodeioniser and/or a mixed bed deioniser.

44. A method as claimed in claim 43 wherein the water purification process includes one of more of the following operations prior to deionisation of the water:
   passage through an activated carbon filter,
   passage through a reverse osmosis system,
   passage through a UV total organic content remover,
and/or one or more of the following operations after contact with the membrane:
   passage through a UV total organic content remover, and
   passage through a polishing loop.

45. A method comprising receiving water in a storage tank,
   adding coagulant to the water,
   pumping the water through a multimedia filter to reduce suspended solids,
   dosing the water with sodium bisulphite to remove free chlorine and dissolved oxygen,
   passing the water through an activated carbon filter to remove organic and residual chloride,
   passing the water through a 1-micron cartridge filter to remove fine solids,
   pumping the water thorough a first-pass reverse osmosis membrane filter,
   adding caustic soda to the water,
   pumping the water though a second-pass reverse osmosis filter,
   feeding a reject stream pass the second pass reverse osmosis filter to a feed stream with the first-pass reverse osmosis filter,
   sending permeate from the second-pass reverse osmosis filter to a permeate storage tank,
   pumping the water from the permeate storage tank a primary UV TOC reducer,
   passing the water form the primary UV TOC reducer to a CEDI unit,
   passing the water through a mixed bed deionizer,
   passing the water through a primary membrane degassifier 13 to remove dissolved oxygen and THM,
   sending the water to a nitrogen blanketed deionized water storage tank,
   pumping the water through a heat exchanger to reduce water temperature,
   passing the water through a secondary UV TOC reducer to remove organics,
   passing the water through a sacrificial polishing mixed bed deionizer,
   passing the water thought a secondary membrane degassifier,
   passing the water through a UV disinfection unit,
   passing the water through a 0.1 micron absolute cartridge filter,
   sending the water to an ultrafriction unit,
   using the water for an application, and
   sending return water to the deionizer water storage tank through a return UV disinfection unit.

* * * * *